United States Patent
Yang et al.

(10) Patent No.: US 8,244,196 B2
(45) Date of Patent: Aug. 14, 2012

(54) APPARATUS AND METHOD FOR ESTIMATING NOISE AND INTERFERENCE POWER IN A COMMUNICATION SYSTEM

(75) Inventors: Ha-Young Yang, Yongin-si (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 12/363,363

(22) Filed: Jan. 30, 2009

(65) Prior Publication Data

US 2009/0191818 A1 Jul. 30, 2009

(30) Foreign Application Priority Data

Jan. 30, 2008 (KR) .......................... 10-2008-0009778

(51) Int. Cl.
 H04B 1/10 (2006.01)
(52) U.S. Cl. ...... 455/296; 455/114; 370/252; 324/76.21
(58) Field of Classification Search .................. 455/296
 See application file for complete search history.

(56) References Cited

U.S. PATENT DOCUMENTS

| | | | |
|---|---|---|---|
| 7,675,888 B2* | 3/2010 | Modlin et al. | 370/335 |
| 2005/0163264 A1* | 7/2005 | Nakao et al. | 375/343 |
| 2007/0002959 A1* | 1/2007 | Lee et al. | 375/260 |
| 2007/0058524 A1* | 3/2007 | Modlin et al. | 370/208 |
| 2007/0103140 A1* | 5/2007 | Bernard | 324/76.21 |

* cited by examiner

*Primary Examiner* — Zhiyu Lu
*Assistant Examiner* — Fatuma Sherif
(74) *Attorney, Agent, or Firm* — Jefferson IP Law, LLP

(57) ABSTRACT

A method is provided for estimating a Noise and Interference (NI) power in a ranging code reception apparatus in a communication system. The method includes generating S correlation values by calculating correlations between L ranging subcarriers received at a ranging code reception apparatus and L elements included in each of S ranging codes available in the ranging code reception apparatus, detecting N reception-desired ranging codes that the ranging code reception apparatus desires to receive, among the S ranging codes, using the S correlation values, and selecting M remaining ranging codes among (S-N) ranging codes obtained by removing the N reception-desired ranging codes from the S ranging codes, and estimating a first NI power using correlation values for the M remaining ranging codes.

16 Claims, 4 Drawing Sheets

US 8,244,196 B2

APPARATUS AND METHOD FOR ESTIMATING NOISE AND INTERFERENCE POWER IN A COMMUNICATION SYSTEM

PRIORITY

This application claims the benefit under 35 U.S.C. §119(a) of a Korean patent application filed in the Korean Intellectual Property Office on Jan. 30, 2008 and assigned Serial No. 10-2008-0009778, the entire disclosure of which is hereby incorporated by reference.

BACKGROUND OF THE INVENTION

1. Field of the Invention

The present invention relates to an apparatus and method for estimating Noise and Interference (NI) power in a communication system. More particularly, the present invention relates to an apparatus and method for estimating NI power using a periodic ranging code in a communication system.

2. Description of the Related Art

Research on a next-generation communication system is being conducted to provide Mobile Stations (MSs) with services capable of high-speed, high-capacity data transmission/reception. An example of the next-generation communication system is a communication system using the Institute of Electrical and Electronics Engineers (IEEE) 802.16 standard (hereinafter referred to as an 'IEEE 802.16 communication system').

In the IEEE 802.16 communication system, a ranging operation is performed to adjust a time offset, a frequency offset and power between a Base Station (BS) and an MS. The ranging can be classified into initial ranging, periodic ranging, bandwidth request ranging and handover ranging according to their purpose.

Among others, the initial ranging operation and the periodic ranging operation are used in the IEEE 802.16 communication system, since it is possible to estimate Signal to Interference Noise Ratio (SINR) and Noise and Interference (NI) power used for power control of the IEEE 802.16 communication system through the initial ranging operation and the periodic ranging operation.

However, estimating NI power using the periodic ranging operation may cause an increase in error probability, and a description thereof will be given below.

First, the periodic ranging operation is performed in a state where there is no reference signal, for example, a pilot symbol. In this case, since the NI power is estimated in the state where there is no reference signal, the error probability may increase.

Second, an MS performs the periodic ranging operation using a periodic ranging code randomly selected from previously assigned periodic ranging codes. When the periodic ranging operation is carried out using a contention-based scheme in this way, the ranging codes transmitted from different MSs may collide with each other. The collision between ranging codes may eventually increase error probability for NI power estimation.

When the NI power estimation suffers an error, power control also undergoes error, and the power control error may cause a reduction in system performance of the IEEE 802.16e communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for estimating NI power using a periodic ranging code in a communication system.

In accordance with an aspect of the present invention, an apparatus for estimating a Noise and Interference (NI) power in a ranging code reception apparatus in a communication system is provided. The apparatus includes a multiplier for generating S correlation values by calculating correlations between L ranging subcarriers received at a ranging code reception apparatus and L elements included in each of S ranging codes available in the ranging code reception apparatus, a reception-desired ranging code detector for detecting N reception-desired ranging codes that the ranging code reception apparatus desires to receive, among the S ranging codes, using the S correlation values, a remaining-ranging code selector for selecting M remaining ranging codes among (S-N) ranging codes obtained by removing the N reception-desired ranging codes from the S ranging codes, and an NI power estimator for estimating a first NI power using correlation values for the M remaining ranging codes.

In accordance with another aspect of the present invention, an apparatus for estimating a Noise and Interference (NI) power in a ranging code reception apparatus in a communication system is provided. The apparatus includes a first processor for generating M first correlation NI power values for L ranging subcarriers received through a first antenna, and for generating a first NI power value using the generated M first correlation NI power values, a second processor for generating M second correlation NI power values for L ranging subcarriers received through a second antenna, and for generating a second NI power value using the generated M second correlation NI power values, a combiner for combining the first NI power value with the second NI power value, and a accumulated-average calculator for estimating a third NI power using the combined NI power value. Each of the first and second processors includes a multiplier for generating S correlation values by calculating correlations between L ranging subcarriers received at a ranging code reception apparatus through the first or second antenna and L elements included in each of S ranging codes available in the ranging code reception apparatus, a reception-desired ranging code detector for detecting N reception-desired ranging codes that the ranging code reception apparatus desires to receive, among the S ranging codes, using the S correlation values, a remaining-ranging code selector for selecting M remaining ranging codes among (S-N) ranging codes obtained by removing the N reception-desired ranging codes from the S ranging codes, and for outputting correlation values for the M remaining ranging codes; a norm operator for generating the M first or second correlation NI power values using correlation values for the M remaining ranging codes, and an average operator for calculating an average of the M first or second correlation NI power values, for detecting a correlation NI power average value and a noise power average value, and for estimating the first or second NI power value using the detected correlation NI power average value and noise power average value.

In accordance with yet another aspect of the present invention, a method for estimating a Noise and Interference (NI) power in a ranging code reception apparatus in a communication system is provided. The method includes generating S correlation values by calculating correlations between L ranging subcarriers received at the ranging code reception apparatus and L elements included in each of S ranging codes available in the ranging code reception apparatus, detecting N reception-desired ranging codes that the ranging code reception apparatus desires to receive, among the S ranging codes, using the S correlation values, and selecting M remaining ranging codes among (S-N) ranging codes obtained by removing the N reception-desired ranging codes from the S ranging codes, and estimating a first NI power using correlation values for the M remaining ranging codes.

In accordance with still another aspect of the present invention, a method for estimating a Noise and Interference (NI) power in a ranging code reception apparatus in a communication system is provided. The method includes a first process for generating M first correlation NI power values for L ranging subcarriers received through a first antenna, and for generating a first NI power value using the generated M first correlation NI power values, a second process for generating M second correlation NI power values for L ranging subcarriers received through a second antenna, and for generating a second NI power value using the generated M second correlation NI power values, a third process for combining the first NI power value with the second NI power value, and a fourth process for estimating a third NI power using the combined NI power value. Each of the first and second processes includes a first operation for generating S correlation values by calculating correlations between L ranging subcarriers received at the ranging code reception apparatus through the first or second antenna and L elements included in each of S ranging codes available in the ranging code reception apparatus, a second operation for detecting N reception-desired ranging codes that the ranging code reception apparatus desires to receive, among the S ranging codes, using the S correlation values, a third operation for selecting M remaining ranging codes among (S-N) ranging codes obtained by removing the N reception-desired ranging codes from the S ranging codes, and for generating the M first or second correlation NI power values using correlation values for the M remaining ranging codes, and a fourth operation for detecting a correlation NI power average value and a noise power average value by calculating an average of the M first or second correlation NI power values, and for estimating the first or second NI power value using the detected correlation NI power average value and noise power average value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially," it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention provides an apparatus and method for estimating Noise and Interference (NI) power using a ranging code in a communication system. Although an apparatus and method for estimating NI power will be described herein in connection with a communication system using the Institute of Electrical and Electronics Engineers (IEEE) 802.16 standard (hereinafter referred to as an 'IEEE 802.16 communication system') by way of example, the proposed apparatus and method for estimating NI power can be applied not only to the IEEE 802.16 communication system but also to other communication systems.

Figure 1:
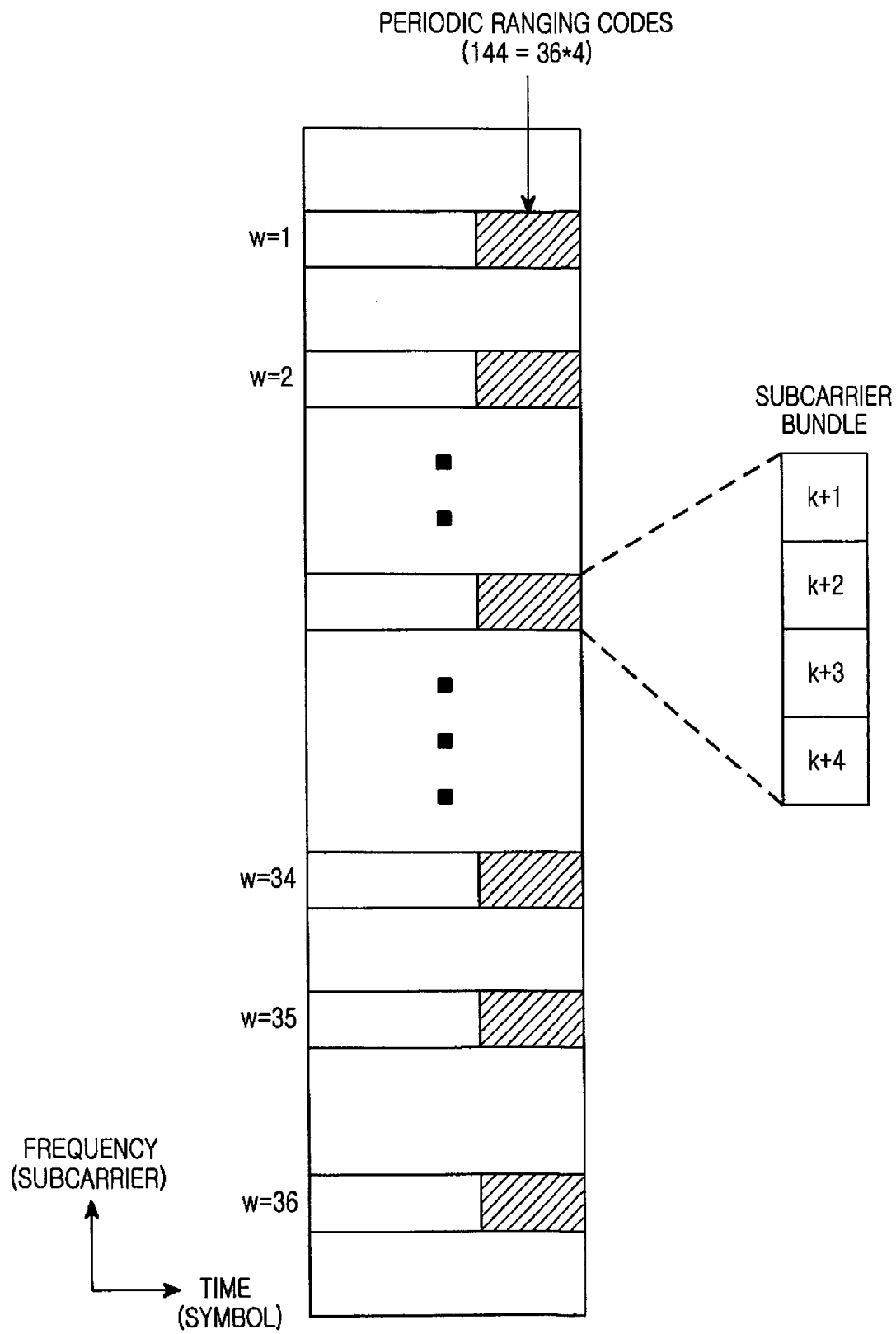
FIG. 1 is a diagram illustrating a method for transmitting a periodic ranging code in an Institute of Electrical and Electronics Engineers (IEEE) 802.16 communication system according to an exemplary embodiment of the present invention.

FIG. 1 is a diagram illustrating a method for transmitting a periodic ranging code in an IEEE 802.16 communication system according to an exemplary embodiment of the present invention.

Referring to FIG. 1, a periodic ranging code is transmitted through a subcarrier bundle including V (e.g., 4) consecutive subcarriers in a frequency domain. Herein, k denotes a ranging subcarrier index. The number of subcarrier bundles is assumed herein to be W (e.g., 36). That is, the periodic ranging codes include L=(V*W) (e.g., 144) elements, and the 144 elements are transmitted through 144 subcarriers. That is, the 144 elements are one-to-one mapped to the 144 subcarriers during their transmission. In FIG. 1, transmission of the periodic ranging code will be described on the assumption that a Base Station (BS) of the IEEE 802.16 communication system uses a Partial Usage of SubChannels (PUSC) permutation scheme.

The IEEE 802.16 communication system supports a tile structure, and the tile occupies 3 symbol intervals in the time domain, and 4 subcarrier bands in the frequency domain. Meanwhile, since the periodic ranging codes are transmitted using 36 subcarrier bundles each including 4 consecutive subcarriers in the frequency domain as described above, it is illustrated in FIG. 1 that the periodic ranging codes are transmitted using 144 subcarriers, i.e., 4 subcarriers corresponding to the third symbol interval for each of 36 tiles included in the first tile (w=1) through the thirty-sixth tile (w=36), where w denotes a tile index.

Figure 2:
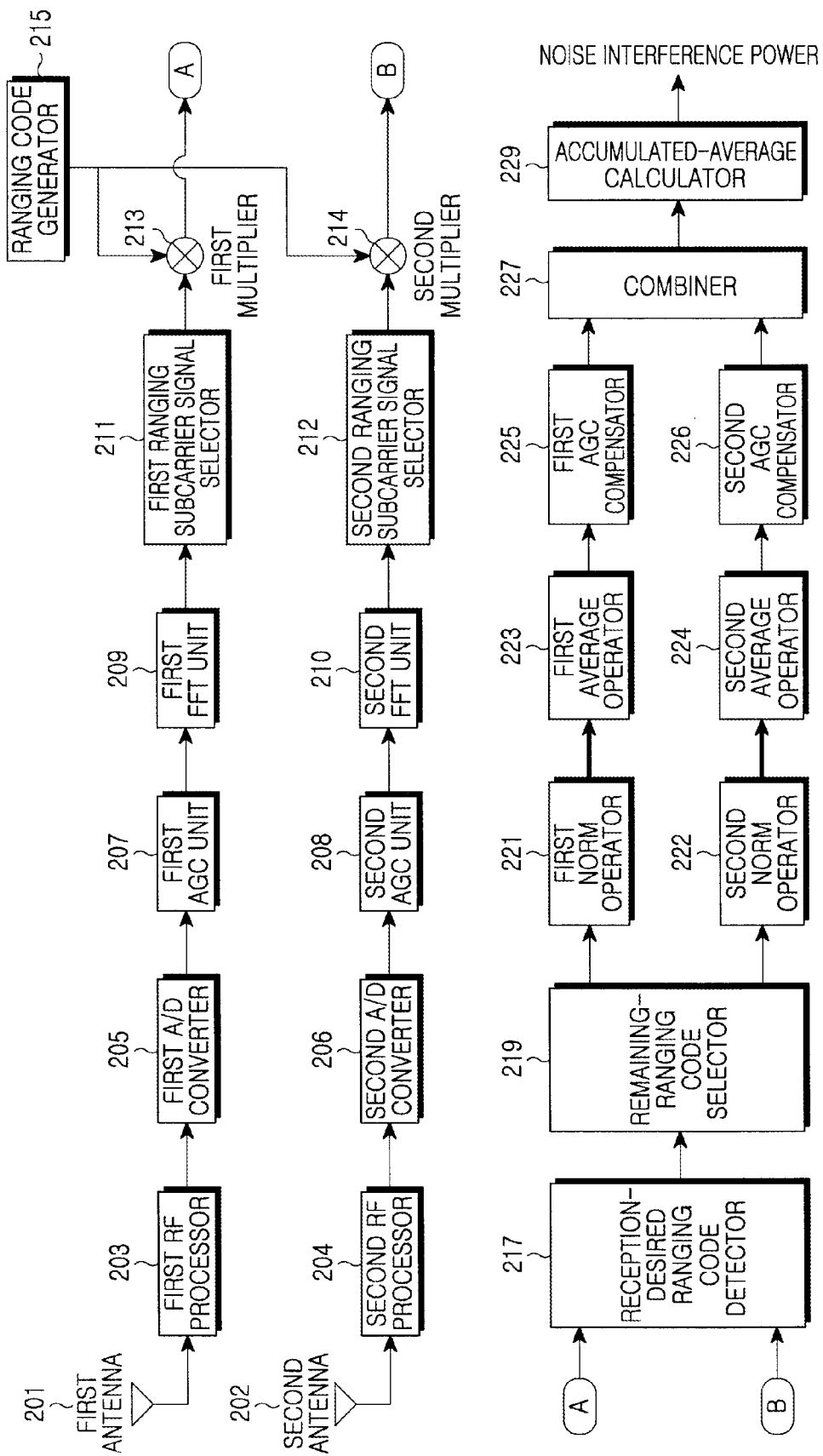
FIG. 2 is a diagram illustrating an internal structure of an NI power estimation apparatus according to an exemplary embodiment of the present invention.

FIG. 2 is a diagram illustrating an internal structure of an NI power estimation apparatus according to an exemplary embodiment of the present invention.

An NI power estimation apparatus illustrated in FIG. 2 is an NI power estimation apparatus for an IEEE 802.16 communication system using Multiple Input Multiple Output (MIMO). It is assumed that the NI power estimation apparatus is included in a ranging code reception apparatus, for example, a BS, and the BS uses, for example, 2 receive antennas.

Referring to FIG. 2, the NI power estimation apparatus includes a first antenna 201, a second antenna 202, a first Radio Frequency (RF) processor 203, a second RF processor 204, a first Analog to Digital (A/D) converter 205, a second A/D converter 206, a first Automatic Gain Control (AGC) unit 207, a second AGC unit 208, a first Fast Fourier Transform (FFT) unit 209, a second FFT unit 210, a first ranging subcarrier signal selector 211, a second ranging subcarrier signal selector 212, a first multiplier 213, a second multiplier 214, a ranging code generator 215, a reception-desired ranging code detector 217, a remaining-ranging code selector 219, a first norm operator 221, a second norm operator 222, a first average operator 223, a second average operator 224, a first AGC compensator 225, a second AGC compensator 226, a combiner 227, and an accumulated-average calculator 229. Herein, the first norm operator 221, the second norm operator 222, the first average operator 223, the second average operator 224, the first AGC compensator 225, the second AGC compensator 226, the combiner 227 and the accumulated-average calculator 229 constitute an NI power estimator.

In operation, the NI power estimation apparatus receives signals including noises such as Additive White Gaussian Noise (AWGN) from MSs via the first antenna 201 and the second antenna 202. The signal received via the first antenna 201 is delivered to the first RF processor 203, and the signal received through the second antenna 202 is delivered to the second RF processor 204.

The first RF processor 203 performs an RF processing operation of down-converting an RF-band signal output from the first antenna 201 into an Intermediate Frequency (IF)-band signal, and then outputs the IF-band signal to the first A/D converter 205. The first A/D converter 205 converts an analog signal output from the first RF processor 203 into a digital signal, and outputs the digital signal to the first AGC unit 207. The first AGC unit 207 receives the digital signal output from the first A/D converter 205, adjusts its power to a preset power, and outputs the power-adjusted signal to the first FFT unit 209. The first FFT unit 209 performs an FFT on the signal output from the first AGC unit 207, and outputs the result to the first ranging subcarrier signal selector 211. The first FFT unit 209 is assumed to perform a K-point FFT, and it is possible to detect a frequency-domain spectrum of the signal received via the first antenna 201 using the first FFT unit 209.

The first ranging subcarrier signal selector 211 receives the signal output from the first FFT unit 209, selects L ranging subcarrier signals from the received signal, and outputs them to the first multiplier 213. The L ranging subcarrier signals represent L subcarrier signals through which L elements included in a ranging code are transmitted. For convenience, the subcarriers through which elements included in the ranging code are transmitted will be referred to herein as 'ranging subcarriers'. The first multiplier 213 multiplies the L ranging subcarrier signals output from the first ranging subcarrier signal selector 211 by a ranging code output from the ranging code generator 215, and outputs the result to the reception-desired ranging code detector 217.

Herein, the first multiplier 213 performs an operation of multiplying the L ranging subcarrier signals by L elements included in the ranging code on a one-to-one basis, thus serving as a correlator. When the number of ranging codes supportable by the BS is S, the number of ranging codes generated by the ranging code generator 215 is S. Therefore, the L ranging subcarrier signals are multiplied by L elements included in each of the S ranging codes on a one-to-one basis, so the first multiplier 213 outputs a total of S correlation values. Meanwhile, processing on the signal received via the second antenna 202 is substantially similar to the above-described processing operation on the signal received via the first antenna 201, so a detailed description thereof will be omitted herein.

The reception-desired ranging code detector 217 receives the S correlation values output from the first multiplier 213 and the S correlation values output from the second multiplier 214, and detects N ranging codes that the BS desires to receive, where N is an integer greater than or equal to zero (0). For convenience, the ranging code that the BS desires to receive will be referred to herein as a 'reception-desired ranging code'. Thereafter, the reception-desired ranging code detector 217 outputs correlation values for the remaining ranging codes except for the detected N reception-desired ranging codes, i.e., for (S-N) ranging codes, to the remaining-ranging code selector 219. An $i^{th}$ reception-desired ranging code among the N reception-desired ranging codes detected by the reception-desired ranging code detector 217 can be defined using Equation (1), in which:

$$Z_{i,k} = C^*_{i,k} R_k \quad (1)$$

where $C^*_{i,k}$ denotes a $k^{th}$ ranging subcarrier signal in an $i^{th}$ reception-desired ranging code, and $R_k$ can be represented as $$R_k = \sum_{n=1}^{N} (H_{n,k} C_{n,k}) + U_k.$$

The parameter $R_K$ represents a $k^{th}$ ranging subcarrier signal obtained after N ranging codes $C_n$ transmitted by a ranging code transmission apparatus have been received at a ranging code reception apparatus through a wireless channel and have undergone an FFT. $H_{n,k}$ denotes a channel response component, and $U_k$ denotes all noise components except for the signal transmitted by the ranging code transmission apparatus, where k denotes a ranging subcarrier index.

Meanwhile, the reception-desired ranging code detector 217 can detect the N reception-desired ranging codes using various schemes. However, the operation in which the reception-desired ranging code detector 217 detects the N reception-desired ranging codes is not directly related to the present disclosure, therefore a detailed description thereof will be omitted herein.

The remaining-ranging code selector 219 receives correlation values for the (S-N) ranging codes, selects M ranging codes among them, and then outputs correlation values for the selected ranging codes to the first norm operator 221 and the second norm operator 222. The correlation values for the selected ranging codes denotes correlation values between the selected ranging codes and ranging subcarrier signals. For convenience, the ranging code selected by the remaining-ranging code selector 219 will be referred to herein as a 'remaining ranging code'. In addition, the operation in which the remaining-ranging code selector 219 detects the M ranging codes among the (S-N) ranging codes is not directly related to the present disclosure, therefore a detailed description thereof will be omitted herein. An operation of processing the signal received via the first antenna 201 based on the M remaining ranging codes will be described below.

A correlation between the $R_k$ and an $m^{th}$ remaining ranging code among M remaining ranging codes selected by the remaining-ranging code selector 219 can be calculated using Equation (2), in which:

$$Z_m = \frac{1}{L}\sum_{k=1}^{L}\{C_{m,k}^* \times R_k\} \quad (2)$$

$$= \frac{1}{L}\sum_{k=1}^{L}\left\{C_{m,k}^*\left[\sum_{n=1}^{N}(H_{n,k}C_{n,k}) + U_k\right]\right\}$$

$$= \frac{1}{L}\sum_{k=1}^{L}\left\{\sum_{n=1}^{N}(H_{n,k}C_{m,k}^*C_{n,k})C_{m,k}^*U_k\right\}$$

$$= \sum_{n=1}^{N}\left[\frac{1}{L}\sum_{k=1}^{L}(H_{n,k}C_{m,k}^*C_{n,k})\right] + \frac{1}{L}\sum_{k=1}^{L}C_{m,k}^*U_k$$

$$= \rho_{m,N} + \frac{1}{L}\sum_{k=1}^{L}C_{m,k}^*U_k$$

where $\rho_{m,N}$ denotes a sum of N correlation values for an $m^{th}$ remaining ranging code and N reception-desired ranging codes.

The first norm operator 221 performs a norm operation on each of correlation values for the M remaining ranging codes. The norm operation is an operation of squaring the total size, and a norm operation on a correlation value for an $m^{th}$ remaining ranging code among the correlation values for the M remaining ranging codes can be expressed using Equation (3), in which:

$$|Z_m|^2 = \left|\rho_{m,N} + \frac{1}{L}\sum_{k=1}^{L}C_{m,k}^*U_k\right|^2 \quad (3)$$

$$\approx |\rho_{m,N}|^2 + |U|^2$$

where $|U|^2$ denotes an average noise power for all ranging subcarrier signals. In this way, the first norm operator 221 can detect a correlation NI power for the $m^{th}$ remaining ranging code and each of the reception-desired ranging codes, and outputs the detected correlation NI power to the first average operator 223.

The first average operator 223 receives a correlation NI power value for each of the M remaining ranging codes, output from the first norm operator 221, and calculates an average of the received correlation NI power values, which can be expressed using Equation (4), in which:

$$NI_t = \frac{1}{M}\sum_{m=1}^{M}|Z_m|^2 \quad (4)$$

$$\approx \frac{1}{M}\sum_{m=1}^{M}|\rho_{m,N}|^2 + \frac{1}{M}\sum_{m=1}^{M}|U|^2$$

$$= I_t + N_t$$

where $$I_t = \frac{1}{M}\sum_{m=1}^{M}|\rho_{m,N}|^2$$

denotes an average of correlation NI power values between N reception-desired ranging codes and M remaining ranging codes, and $$N_t = \frac{1}{M}\sum_{m=1}^{M}|U|^2$$

denotes an average of noise power.

As shown in Equation (4), by estimating an NI power including the average correlation NI power except for the pure noise power, a BS can estimate the NI power by more precisely taking the uplink channel environment into account, and an MS can transmit a desired ranging code at a proper power level. Therefore, in order to provide MSs with information on a frequency of receiving a ranging code and on transmission power of the ranging code, the BS estimates the interference through a correlation between S available ranging codes and the received ranging code, and provides the estimate of the interference to the MSs along with the NI power. Since the N reception-desired ranging codes detected by the reception-desired ranging code detector 217 are included in the ranging codes that are actually transmitted by the MSs, the N reception-desired ranging codes detected by the reception-desired ranging code detector 217 are excluded from the calculation of the correlation NI power.

The first AGC compensator 225 receives the signal output from the first average operator 223, compensates the power adjusted by the first AGC unit 207, and outputs the result to the combiner 227. The second norm operator 222, the second average operator 224 and the second AGC compensator 226 are also substantially similar in operation to the first norm operator 221, the first average operator 223 and the first AGC compensator 225, therefore a detailed description thereof will be omitted.

The combiner 227 receives the signals output from the first AGC compensator 225 and the second AGC compensator 226, combines NI power values measured for individual antennas, and outputs the result to the accumulated-average calculator 229. The combiner 227 can compare the NI power values measured for individual antennas to select an NI power value of a particular antenna, and output the selected NI power value to the accumulated-average calculator 229.

The accumulated-average calculator 229 calculates an accumulated average value of NI power by accumulating the signals output from the combiner 227 for a predefined time period. By calculating an average value by accumulating NI power in this manner, it is possible to accurately estimate the NI power by taking into account the delay time required for power control and the average correlation NI power between ranging codes. The accumulated average value of NI power can be defined using Equation (5), in which:

$$NI = \frac{1}{T}\sum_{t=1}^{T} NI_t \quad (5)$$

Although the NI power estimation apparatus has been described above with reference to FIG. 2 on the assumption that the IEEE 802.16 communication system uses MIMO, the NI power estimation apparatus proposed by exemplary embodiments of the present invention can be used in other cases, such as a case where the IEEE 802.16 communication system uses Single Input Single Output (SISO). In this case, the NI power estimation apparatus estimates NI power only for any one of the signals received via the first antenna 201 and the second antenna 202 illustrated in FIG. 2. For example, when the NI power estimation apparatus estimates NI power using the signal received via the first antenna 201, the power estimation apparatus may include only the first RF processor 203, the first A/D converter 205, the first AGC unit 207, the first FFT unit 209, the first ranging subcarrier signal selector 211, the first multiplier 213, the ranging code generator 215, the reception-desired ranging code detector 217, the remaining-ranging code selector 219, the first norm operator 221, the first average operator 223, the first AGC compensator 225 and the accumulated-average calculator 229. In this case, the first norm operator 221, the first average operator 223, the first AGC compensator 225 and the accumulated-average calculator 229 constitute an NI power estimator.

Figure 3A:
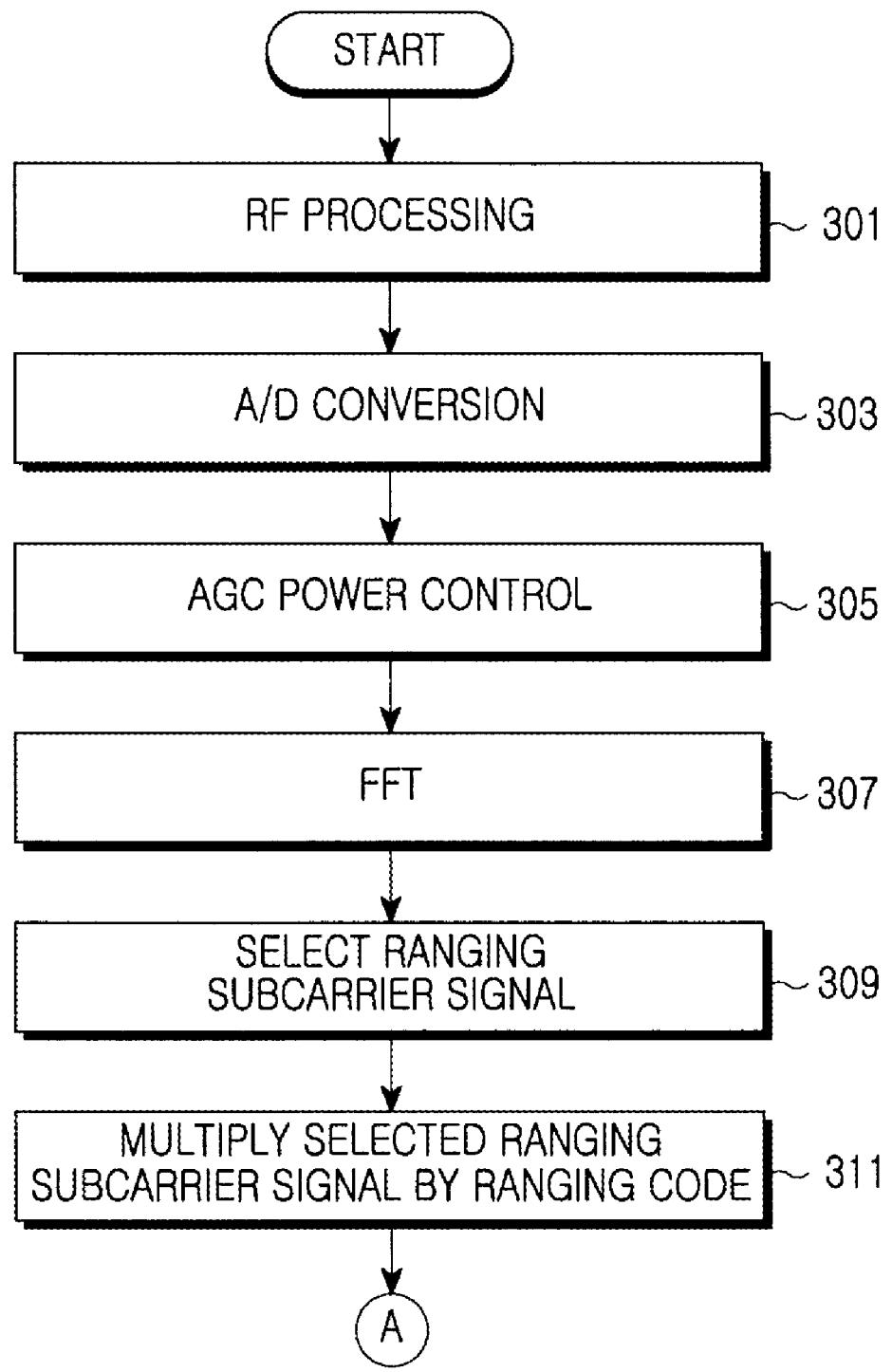
FIGS. 3A and 3B are flowcharts illustrating a process of estimating an NI power using a periodic ranging signal by a BS according to an exemplary embodiment of the present invention.
Figure 3B:
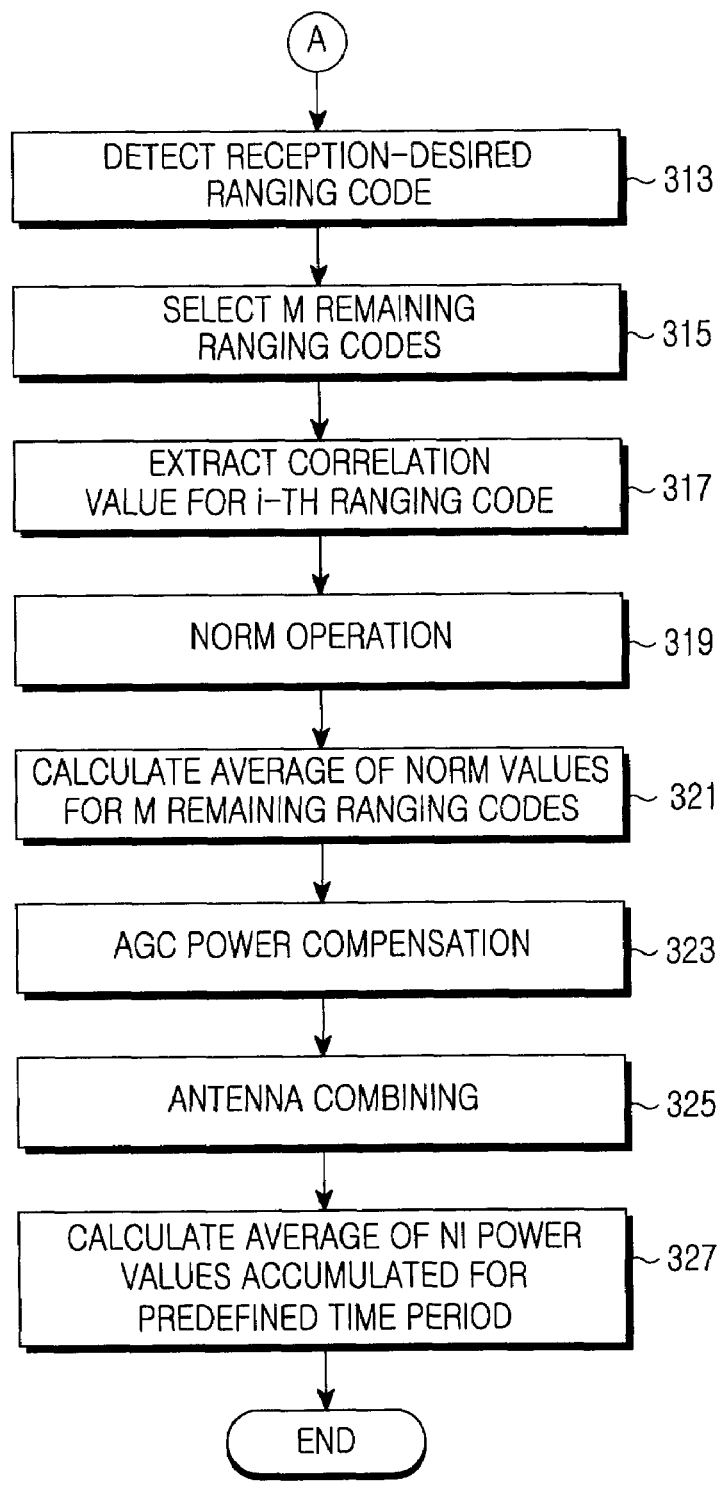

FIGS. 3A and 3B are flowcharts illustrating a process of estimating an NI power using a periodic ranging signal by a BS according to an exemplary embodiment of the present invention.

Referring to FIGS. 3A and 3B, in step 301, the BS performs an RF processing operation of down-converting RF-band signals received from antennas into IF-band signals. In step 303, the BS converts the RF-processed analog signal into a digital signal. In step 305, the BS adjusts a power of the digital-converted signal to a preset power. In step 307, the BS performs an FFT on the power-adjusted signal. In step 309, the BS selects a ranging subcarrier signal from the FFT-processed signal. In step 311, the BS multiplies the selected ranging subcarrier signal by a ranging code.

In step 313, the BS detects a ranging code it desires to receive, from the ranging subcarrier signal multiplied by the ranging code. In step 315, the BS selects the remaining ranging codes except for the detected reception-desired ranging code, i.e., M remaining ranging codes. In step 317, the BS extracts a correlation value for an $i^{th}$ ranging code among the M remaining ranging codes. In step 319, the BS performs a norm operation on the extracted correlation value. In step 321, the BS calculates an average value for all values that underwent a norm operation, after performing steps 317 and 319 for all of the remaining ranging codes selected in step 315.

In step 323, the BS compensates the power AGC-adjusted in step 305. In step 325, the BS combines the NI power values measured by performing steps 301 to 323 on the signals received via all its antennas. In step 327, the BS calculates an average by accumulating the combined NI power values for a predefined time period.

As is apparent from the foregoing description, exemplary embodiments of the present invention estimates an accurate NI power using a periodic ranging code in the communication system, thereby contributing to an improvement in the overall performance of the communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for estimating a Noise and Interference (NI) power in a ranging code reception apparatus in a communication system, the method comprising:
generating S correlation values by calculating correlations between L ranging subcarriers received at a ranging code reception apparatus and L elements included in each of S ranging codes available in the ranging code reception apparatus;
detecting N reception-desired ranging codes that the ranging code reception apparatus desires to receive, among the S ranging codes, using the S correlation values;
selecting M remaining ranging codes among (S-N) ranging codes obtained by removing the N reception-desired ranging codes from the S ranging codes; and
estimating a NI power using correlation values for the M remaining ranging codes.

2. The method of claim 1, wherein the estimating of the NI power comprises:
detecting M correlation NI power values by performing a norm operation on each of correlation values for the M remaining ranging codes;
calculating an average value of the M correlation NI power values; and
accumulating the calculated average value for a predefined time period, and calculating an average thereof.

3. The method of claim 2, wherein the calculated average value comprising an average of the M remaining ranging codes and the N reception-desired ranging codes, and an average noise power.

4. The method of claim 1, wherein the correlation values for the M remaining ranging codes denote correlation values between L elements included in each of the M remaining ranging codes and the L ranging subcarriers.

5. An apparatus for estimating a Noise and Interference (NI) power in a ranging code reception apparatus in a communication system, the apparatus comprising:
a multiplier for generating S correlation values by calculating correlations between L ranging subcarriers received at a ranging code reception apparatus and L elements included in each of S ranging codes available in the ranging code reception apparatus;
a reception-desired ranging code detector for detecting N reception-desired ranging codes that the ranging code reception apparatus desires to receive, among the S ranging codes, using the S correlation values;
a remaining-ranging code selector for selecting M remaining ranging codes among (S-N) ranging codes obtained by removing the N reception-desired ranging codes from the S ranging codes; and
an NI power estimator for estimating a NI power using correlation values for the M remaining ranging codes.

6. The apparatus of claim 5, wherein the NI power estimator comprises:
a norm operator for detecting M correlation NI power values by performing a norm operation on each of correlation values for the M remaining ranging codes;

an average operator for calculating an average value of the M correlation NI power values; and an accumulated-average calculator for accumulating the calculated average value for a predefined time period, for calculating an average thereof.

7. The apparatus of claim 6, wherein the calculated average value comprising an average of the M remaining ranging codes and the N reception-desired ranging codes, and an average noise power.

8. The apparatus of claim 5, wherein the correlation values for the M remaining ranging codes denote correlation values between L elements included in each of the M remaining ranging codes and the L ranging subcarriers.

9. A method for estimating a Noise and Interference (NI) power in a ranging code reception apparatus in a communication system, the method comprising:

a first process for generating M first correlation NI power values for L ranging subcarriers received through a first antenna, and for generating a first NI power value using the generated M first correlation NI power values;

a second process for generating M second correlation NI power values for L ranging subcarriers received through a second antenna, and for generating a second NI power value using the generated M second correlation NI power values;

a third process for combining the first NI power value with the second NI power value; and a fourth process for estimating a third NI power using the combined NI power value, wherein each of the first and second processes comprises:
a first operation for generating S correlation values by calculating correlations between L ranging subcarriers received at the ranging code reception apparatus through the first or second antenna and L elements included in each of S ranging codes available in the ranging code reception apparatus;

a second operation for detecting N reception-desired ranging codes that the ranging code reception apparatus desires to receive, among the S ranging codes, using the S correlation values;

a third operation for selecting M remaining ranging codes among (S-N) ranging codes obtained by removing the N reception-desired ranging codes from the S ranging codes, and for generating the M first or second correlation NI power values using correlation values for the M remaining ranging codes; and a fourth operation for calculating an average value of the M first or second correlation NI power values, and for estimating the first or second NI power value using the calculated average value.

10. The method of claim 9, wherein the third operation comprises generating the M first or second correlation NI power values by performing a norm operation on each of the correlation values for the M remaining ranging codes, and wherein the fourth process comprises accumulating the combined NI power value for a predefined time period, and calculating an average thereof.

11. The method of claim 9, wherein the calculated average value comprising an average of the M remaining ranging codes and the N reception-desired ranging codes, and an average noise power.

12. The method of claim 9, wherein the correlation values for the M remaining ranging codes denote correlation values between L elements included in each of the M remaining ranging codes and the L ranging subcarriers.

13. An apparatus for estimating a Noise and Interference (NI) power in a ranging code reception apparatus in a communication system, the apparatus comprising:

a first processor for generating M first correlation NI power values for L ranging subcarriers received through a first antenna, and for generating a first NI power value using the generated M first correlation NI power values;

a second processor for generating M second correlation NI power values for L ranging subcarriers received through a second antenna, and for generating a second NI power value using the generated M second correlation NI power values;

a combiner for combining the first NI power value with the second NI power value; and a accumulated-average calculator for estimating a third NI power using the combined NI power value;

wherein each of the first and second processors comprises:
a multiplier for generating S correlation values by calculating correlations between L ranging subcarriers received at the ranging code reception apparatus through the first or second antenna and L elements included in each of S ranging codes available in the ranging code reception apparatus;

a reception-desired ranging code detector for detecting N reception-desired ranging codes that the ranging code reception apparatus desires to receive, among the S ranging codes, using the S correlation values;

a remaining-ranging code selector for selecting M remaining ranging codes among (S-N) ranging codes obtained by removing the N reception-desired ranging codes from the S ranging codes, and for outputting correlation values for the M remaining ranging codes;

a norm operator for generating the M first or second correlation NI power values using correlation values for the M remaining ranging codes; and an average operator for calculating an average value of the M first or second correlation NI power values, and for estimating the first or second NI power value using the calculated average value.

14. The apparatus of claim 13, wherein the norm operator generates the M first or second correlation NI power values by performing a norm operation on each of correlation values for the M remaining ranging codes, and wherein the accumulated-average calculator accumulates the combined NI power value for a predefined time period, calculates an average thereof.

15. The apparatus of claim 13, wherein the calculated average value comprising an average of the M remaining ranging codes and the N reception-desired ranging codes, and an average noise power.

16. The apparatus of claim 13, wherein the correlation values for the M remaining ranging codes denote correlation values between L elements included in each of the M remaining ranging codes and the L ranging subcarriers.

* * * * *